(12) United States Patent
Geistbeck et al.

(10) Patent No.: US 12,196,367 B2
(45) Date of Patent: Jan. 14, 2025

(54) HYDROGEN TANK ASSEMBLY FOR A VEHICLE, SUCH AS AN AIRCRAFT

(71) Applicant: Airbus SAS, Blagnac (FR)

(72) Inventors: Matthias Geistbeck, Blagnac (FR); Kristian Zimmermann, Blagnac (FR); Christian Metzner, Blagnac (FR); Uwe Beier, Blagnac (FR)

(73) Assignee: Airbus SAS, Blagnac (FR)

( * ) Notice: Subject to any disclaimer, the term of this patent is extended or adjusted under 35 U.S.C. 154(b) by 125 days.

(21) Appl. No.: 18/073,015

(22) Filed: Dec. 1, 2022

(65) Prior Publication Data

US 2023/0175647 A1    Jun. 8, 2023

(30) Foreign Application Priority Data

Dec. 6, 2021  (EP) .................................. 21212634

(51) Int. Cl.
*F17C 1/00*       (2006.01)

(52) U.S. Cl.
CPC ...... *F17C 1/005* (2013.01); *F17C 2201/0109* (2013.01); *F17C 2203/0604* (2013.01);
(Continued)

(58) Field of Classification Search
CPC ............. F17C 1/005; F17C 2201/0109; F17C 2203/0604; F17C 2203/0629; F17C 2203/0634; F17C 2221/012; F17C 2223/013; F17C 2260/036; F17C 2270/0168; F17C 2270/0184; F17C 2201/0119; F17C 2201/0128; F17C 2201/0147; F17C 2201/054; F17C 2203/0325; F17C 2203/0329; F17C 2203/0391; F17C 2203/0631; F17C 2203/0663; F17C 2209/232;
(Continued)

(56) References Cited

U.S. PATENT DOCUMENTS 3,473,343 A * 10/1969 Chamberlain ............ F17C 9/00
                                                     62/7
3,993,213 A * 11/1976 Burge .................... B65D 90/06
                                                  220/560.08
(Continued)

FOREIGN PATENT DOCUMENTS

CN    112539344 A    3/2021
DE    102015225348 A1   6/2017

OTHER PUBLICATIONS

European Search Report dated May 17, 2022; priority document.
(Continued)

*Primary Examiner* — Kareen K Thomas
(74) *Attorney, Agent, or Firm* — Greer, Burns & Crain, Ltd.

(57) ABSTRACT

For improving storage of hydrogen in a vehicle, a hydrogen tank assembly is provided for a vehicle. The hydrogen tank assembly includes an inner tank wall defining a hydrogen
(Continued)

tank volume configured for storing liquid hydrogen; and an outer hydrogen collector defining, together with the inner tank wall, at least one cavity outside of the hydrogen tank volume and including at least one hydrogen outlet for leading gaseous hydrogen which leaks from the hydrogen tank through the inner tank wall into the at least one cavity to a hydrogen storage or a hydrogen consumer.

11 Claims, 6 Drawing Sheets

(52) U.S. Cl.
CPC ............. *F17C 2203/0629* (2013.01); *F17C 2203/0634* (2013.01); *F17C 2221/012* (2013.01); *F17C 2223/013* (2013.01); *F17C 2260/036* (2013.01); *F17C 2270/0168* (2013.01); *F17C 2270/0184* (2013.01)

(58) Field of Classification Search
CPC ........ F17C 2223/0153; F17C 2223/033; F17C 2250/043; F17C 2250/0434; F17C 2250/0439; F17C 2250/0452; F17C 2260/037; F17C 2260/038; F17C 2270/0189; F17C 3/04; Y02E 60/32; B64D 37/30; B64D 27/02; B64D 27/026; B64D 27/10; B64D 37/06
See application file for complete search history.

(56) References Cited

U.S. PATENT DOCUMENTS

| | | | | |
|---|---|---|---|---|
| 4,774,118 A | * | 9/1988 | Davis | B32B 1/00 428/44 |
| 4,867,044 A | * | 9/1989 | Holtrop | B64C 13/40 220/62.19 |
| 5,150,812 A | * | 9/1992 | Adams | F17C 1/16 220/560.04 |
| 6,082,676 A | * | 7/2000 | Cochran | F17C 1/14 244/172.3 |
| 10,584,828 B2 | | 3/2020 | Brooks et al. | |
| 2005/0001100 A1 | * | 1/2005 | Hsi-Wu | B32B 5/18 244/172.2 |
| 2008/0017524 A1 | * | 1/2008 | Powell | F17C 11/00 206/0.6 |
| 2008/0135081 A1 | * | 6/2008 | Sharifi | B64D 37/06 136/207 |
| 2020/0224412 A1 | | 7/2020 | Chopard et al. | |
| 2020/0309324 A1 | | 10/2020 | Law | |

OTHER PUBLICATIONS

Material & Formen unserer Vakuumisolationspaneele va-Q-tec, downloaded on Nov. 26, 2021 under the link "https://va-q-tec.com/technologie/vakuumisolationspaneele/material-formen/"; 11 pages.

* cited by examiner

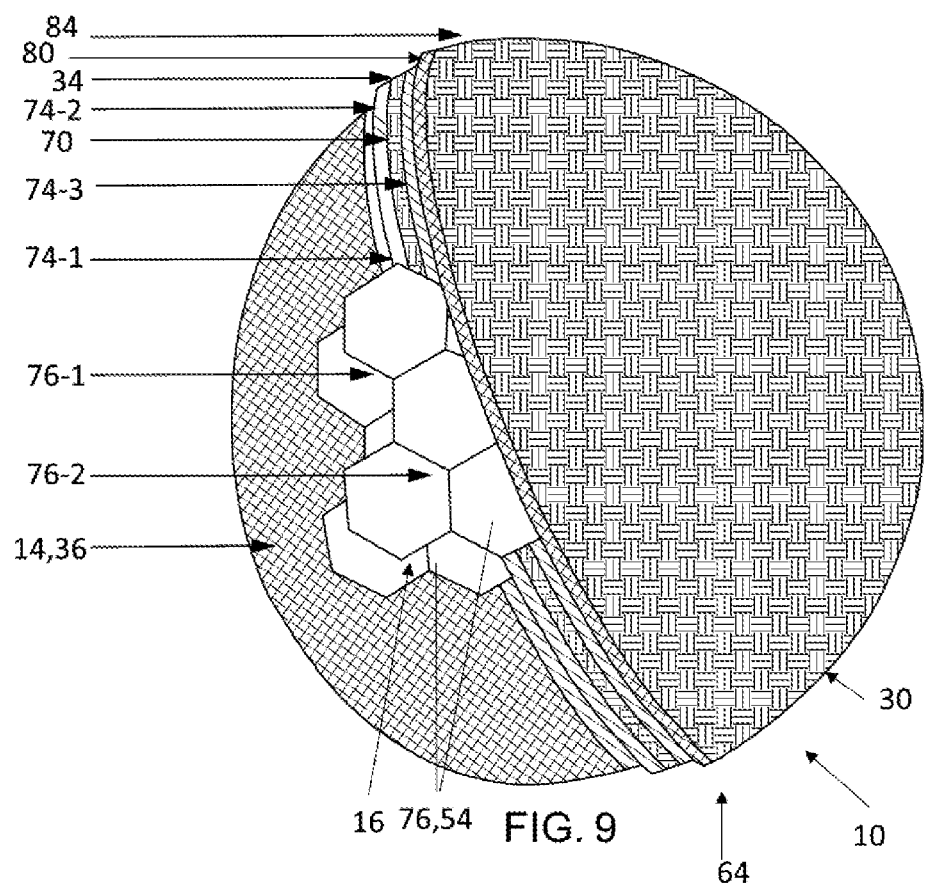
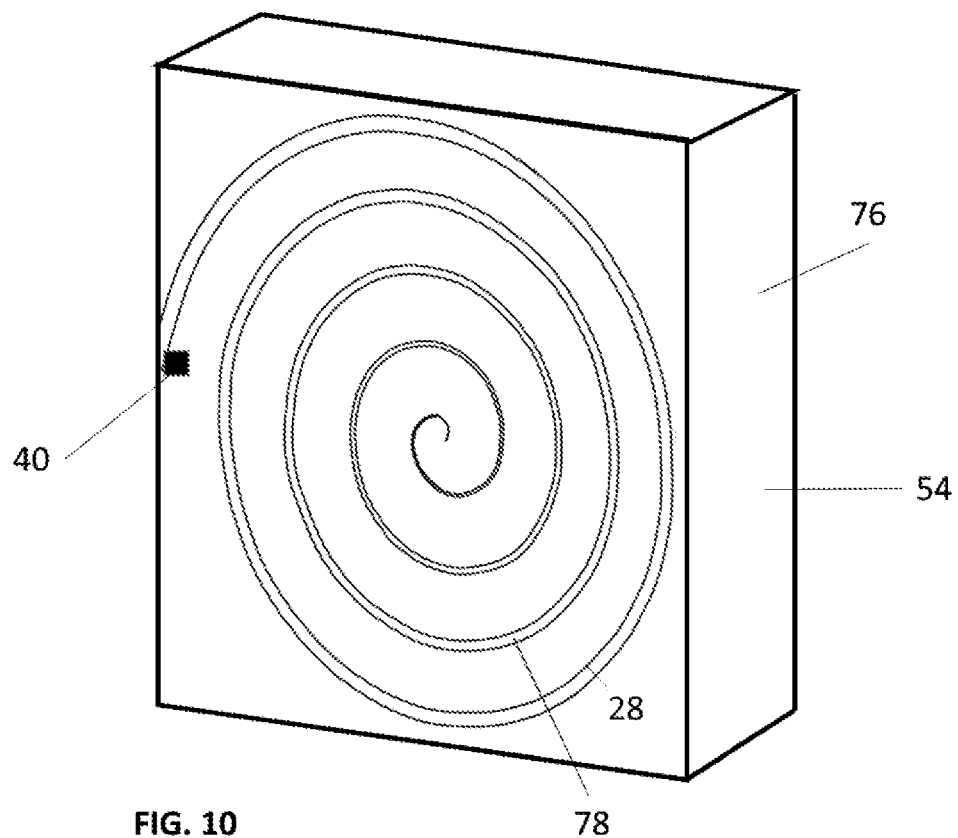

HYDROGEN TANK ASSEMBLY FOR A VEHICLE, SUCH AS AN AIRCRAFT

CROSS-REFERENCES TO RELATED APPLICATIONS

This application claims the benefit of the European patent application No. 21212634.6 filed on Dec. 6, 2021, the entire disclosures of which are incorporated herein by way of reference.

FIELD OF THE INVENTION

The invention relates to a hydrogen tank assembly for a vehicle, preferably an aircraft. The invention further relates to an aircraft having such a hydrogen tank assembly.

BACKGROUND OF THE INVENTION

For the background of the invention, reference is made to the following literature:
[1] US 2020/0224412 A1
[2] webpage "Material & Formen unserer Vakuumisolationspaneele vaQ-tec", downloaded on Nov. 26, 2021 under the link "https://va-q-tec.com/technologie/vakuumisolationspaneele/material-formen/",
[3] U.S. Pat. No. 10,584,828 B2

Literature [1] relates to a different field, namely the field of thermal management through thermally insulating elements or even materials, the latent heat of which is used such as phase change materials. This document discloses an assembly comprising at least one first pocket containing insulating material and in which a first controlled atmosphere prevails and at least one second pocket which surrounds the first pocket and in which a second controlled atmosphere, different from the first atmosphere, prevails. The insulation material contained in the pocket is a rigid panel made from open porous material. Cavities within the panel form a network of channels so that air included in the cavities can be evacuated efficiently in order to form vacuum panels. Such rigid panels for forming vacuum panels are available on the market and well know.

From document [2] different core materials for vacuum isolation panels are known which are available on the market. All these core materials form rigid panels with a network of cavities that can be easily evacuated when forming a vacuum isolation panel.

Document [3] discloses a hydrogen storage tank for a hydrogen fueled aircraft. The tank has a spherical shape and a wall made from layers of aerogel sections around a hard shell layer, sealed within a flexible outer layer, and having the air removed from a vacuum. A hard shell of the tank is tiled with packaged sections of aerogel using a convenient tiling pattern; for example, the spherical tank is covered by 40 tiles. For the spherical tank, a soccer-ball-like tiling pattern is proposed.

Lightweight energy storage is a key topic for next generation aircraft. Storage systems with high energy density are one of the key challenges for future electrical propulsion-based systems. Different energy storage systems are available today, whereas pressurized (~700 bar) or cryogenic Hydrogen (14 K<T<21 K) paired with fuel cells or direct burn are interesting solutions for next flight vehicles. Hydrogen ($H_2$) is the molecule with lowest density and smallest diameter in nature, which is why the storage in tanks is very complex and hardly achievable without leakage over longer durations.

Hydrogen offers high energy densities, whereas the storage technique (cryogenic, compressed, solid state/absorbed) is a key issue. Hydrogen can be compressed and/or cooled down to cryogenic temperatures to increase the volumetric and gravimetric energy density. Usually, complex tank systems are needed with individual requirements to the materials, design and working principle e.g., regarding operational safety.

Compressed and cryogenic hydrogen are the techniques of choice for today's vehicles, like cars or airplanes. Cryogenic tanks can achieve the lowest added weight wherein, with the present known technologies, about 0.2 kg-0.5 kg tank weight is needed per kg stored $H_2$. Conventional tanks work with applied inner pressure to avoid gas ingress from outside. As tank material typically metals, metal alloys and composites are in use. Full composite tanks can be challenging because of the long in-service life of civil aircraft. Hydrogen leakage may also be an issue.

SUMMARY OF THE INVENTION

It is an object of the invention to improve hydrogen tanks for use in vehicles, such as aircraft.

The object is achieved by the subject-matter of the independent claims. Preferred embodiments are subject-matter of the dependent claims.

The invention provides a hydrogen tank assembly for a vehicle, the hydrogen tank assembly comprising:
an inner tank wall defining a hydrogen tank volume configured for storing liquid hydrogen; and
an outer hydrogen collector defining, together with the inner tank wall, at least one cavity outside of the hydrogen tank volume and including at least one hydrogen outlet for leading gaseous hydrogen which leaks from the hydrogen tank through the inner tank wall into the at least one cavity to a hydrogen storage or a hydrogen consumer.

Preferably, the hydrogen collector surrounds the inner tank wall.

Preferably, the hydrogen collector includes at least one hydrogen collector ply.

Preferably, the hydrogen collector includes a rigid element that forms together with the rigid inner tank wall the at least one cavity configured as a hydrogen flow channel, wherein the at least one cavity is separated toward the outer atmosphere.

Preferably, the at least one collector ply is or includes a permeable layer.

Preferably, the at least one collector ply is or includes a micro porous material.

Preferably, the at least one collector ply is or includes a non-woven fabric.

Preferably, the at least one collector ply is or includes a bulky non-woven fabric.

Preferably, the at least one collector ply is or includes a permeably fabric.

Preferably, the at least one collector ply is or includes a permeable dry fabric.

Preferably, the at least one collector ply is or includes a woven fabric.

Preferably, the at least one collector ply is or includes an open-porous foam.

Preferably, the at least one collector ply is or includes a ply with several layers with non-uniform thickness.

Preferably, the at least one collector ply is or includes a material with flow channels.

Preferably, the at least one collector ply is or includes a material with flow channels with different flow channel density in different areas.

Preferably, the at least one collector ply is or includes a fabric with incorporated drainage pipes.

Preferably, the at least one collector ply is or includes an open porous insulation material.

Preferably, the at least one collector ply is or includes a combination of at least two of a permeable layer, a micro porous material, a non-woven fabric, a bulky non-woven fabric, a permeably fabric, a permeable dry fabric, an open-porous foam, a ply with several layers with non-uniform thickness, a material with flow channels, a material with flow channels with different flow channel density in different areas, a fabric with incorporated drainage pipes, a woven fabric, and an open porous insulation material.

Preferably, the at least one rigid element is or includes a permeable layer.

Preferably, the at least one rigid element is or includes a macro porous material.

Preferably, the at least one rigid element is or includes a folded core.

Preferably, the at least one rigid element is or includes a combination of a folded core with insulation material.

Preferably, the at least one rigid element is or includes an arrangement of perforated honeycombs.

Preferably, the at least one rigid element is or includes a rigid element with several cavities.

Preferably, the at least one rigid element is or includes a tile with drainage channels.

Preferably, the at least one rigid element is or includes a plurality of elements covering the inner tank wall in one or several layers.

Preferably, the at least one rigid element is or includes a plurality of polyhedral elements covering the inner tank wall in one or several layers.

Preferably, the at least one rigid element is or includes an element being at least partly covered by dry textiles.

Preferably, the at least one rigid element is or includes a tile suitable for a soccer-ball-shaped tiling pattern.

Preferably, the at least one rigid element is or includes an element containing an insulation core containing vacuum or glass bubbles.

Preferably, the at least one rigid element is or includes an element containing an insulation core containing an aerogel.

Preferably, the at least one rigid element is or includes a combination of at least two of a permeable layer, a macro porous material, a folded core, an arrangement of perforated honeycombs, a rigid element with several cavities, a tile with drainage channels, a plurality of tiles covering the inner tank wall in one or several layers; an element being at least partly covered by dry textiles, an element containing an insulation core comprising vacuum or glass bubbles, an element containing an insulation core comprising an aerogel.

Preferably, the at least one rigid element comprises an additional gas tight layer.

Preferably, an outer side of the at least one rigid element is sealed by a gas tight layer.

Preferably, the at least one rigid element is arranged between the inner tank wall and an outside layer, wherein the hydrogen tank assembly comprises an atmosphere control device configured to control the atmosphere between the inner tank wall and the outside layer.

Preferably, several of the rigid elements cover the inner tank wall in one or several layers.

Preferably, several of the rigid elements are at least partly connected to adjacent layers, especially by an adhesive, by welding and/or by a form-fit connection.

Preferably, the at least one cavity is defined by a plurality of cavities forming at least one interconnected channel system.

Preferably, the at least one cavity is part of a channel system having at least one outlet tube.

Preferably, the at least one cavity is defined by a plurality of cavities connected such that they form several channel systems wherein each channel system has at least one outlet tube.

Preferably, the at least one cavity is configured to be influenced, especially flushed, by a flushing medium.

According to another aspect, the invention provides a modular hydrogen tank comprising several hydrogen tank assemblies according to any of the aforementioned embodiments as tank modules.

According to another aspect, the invention provides a propulsion system for an aircraft comprising a hydrogen tank assembly according to any of the aforementioned embodiments and a hydrogen powered engine as hydrogen consumer and/or a hydrogen powered fuel cell as hydrogen consumer and an electric motor.

According to another aspect, the invention provides a vehicle, especially aircraft, comprising a hydrogen tank assembly according to any of the aforementioned embodiments, a modular hydrogen tank according to the aforementioned embodiment and/or a propulsion system according to the aforementioned embodiment.

Preferred embodiments of the invention relate to tank arrangements for storing hydrogen and for use in vehicles, especially aircraft.

Preferred embodiments of the invention refer to hydrogen collector materials for innovative tank systems.

According to several embodiments of the invention, different solutions for $H_2$ storage can be used. In principle, there are especially two different solutions for $H_2$ storage—pressurized or cryogenic $H_2$. Beside metals, the tanks are preferably manufactured with high strength carbon-fiber based composites with or without additional metal or polymer liners. Hence, different tank types can be used.

A tank according to some embodiments of the invention is based on an accepted leakage of the inner tank wall, whereas a certain amount of gaseous $H_2$ ($GH_2$) is accepted to permeate through the inner tank wall. In order to increase $H_2$ safety and efficiency, the $GH_2$ is preferably stored and evacuated, especially in a so-called collector ply, which more preferably surrounds the inner tank wall. For a better evacuation, the collector ply can be purged with Helium or other inert gases which are gaseous at cryogenic temperatures (20K). For more details referring to a possible supply of a flush medium to the hydrogen collector, reference is made to the EP patent application with the application no. 21 185 667.9 as filed on Jul. 14, 2021, the content thereof is incorporated herein by reference. Some embodiments of the invention are equipped with the technology described in this previously filed EP patent application.

The collector ply as used in some of the embodiments of the invention has at least one or several of the following features in order to adapt it better to the corresponding system requirements.

Preferably, the ply is open porous in in- and out-of-plane direction. Enabling a purging gas flow, the in-plane permeability is preferably as low as possible.

Preferably, the ply is able to transfer loads to attach the inner skin to the structural system (sandwich). Preferably, it is configured such that the gravimetric loads of the tank/fuel mass and all in-service loads can be compensated.

Preferably, the ply is configured such that it addresses thermal stresses caused by the CTE mismatch between insulation (foam, honeycomb, glass bubbles, Aerogels . . . ) and a CFRP inner skin/outer jacket; an inverse CTE e.g., comparable to meta-materials, is desired (CTE=coefficient of thermal expansion; CFRP=carbon fiber reinforced polymer).

Preferably, a vapor barrier seals any $GH_2$ in the collector ply from an adjacent insulation material.

Preferably, the ply material is drape-able at least in one direction enabling cylindrical tanks, or even better structural conformal tanks (non-cylindrical)

Several technical solutions are feasible which base on different materials and combinations as described in more detail below. Potential solutions according to preferred embodiments of the invention are based on nano-/micro- (wovens, non-wovens, open porous foams, aerogels, etc.) and/or macro-porous materials (cellular materials like foams, lattices, level surface core structures, etc.). Some embodiments combine different basic concepts to optimize the material properties to the requirements e.g., a foam filled folded core in adapted geometry with high mechanical properties, sufficient permeability, adapted CTE, $GH_2$ barrier to the insulation material.

Preferred embodiments of the invention comprise a rigid element that together with a rigid tank wall forms at least one cavity (especially configured such that it or they form $H_2$ flow channels). These cavities are separated towards the outer atmosphere.

Preferably, the cavities form one or more interconnected networks.

Preferably, each network has at least one outlet "tube".

Preferably, the cavity serves as to remove leaked tank content.

Preferably, the cavity can be influenced by using a flushing media, see for more details for possible technologies: EP 21 185 667.9 as filed on Jul. 14, 2021.

Preferably, the rigid element can be a folded core.

Preferably, the rigid element can be an insulation material.

Preferably, the rigid element may be a combination of a folded core and of an insulation material.

Preferably, the element comprises an additional gas tight layer.

Preferably, the element can be surrounded by a gas tight layer. Preferably, the element surrounded by a thin film becomes rigid by the (negative) pressure difference between inside and outside (applicable for e.g., Glass-spheres).

Preferably, the element is placed between two layers with controlled atmosphere whereas one layer is the tank wall.

According to some embodiments, a plurality of the elements e.g., polyhedral, may cover in one or several layers the tank and can be overlapping.

According to some embodiments, the element(s) may be at least partly covered by dry textiles.

According to some embodiments, the element(s) may at least be partly connected to the adjacent layers (adhesive, welded, form-fit).

According to some embodiments, the hydrogen collector includes, e.g., as the rigid elements, tiles with channels.

Some embodiments provide tiles with single/double curvature, especially in order to cover cylindrical or spherical tank modules. Tiling patterns for such a covering are generally known, for example from U.S. Pat. No. 10,584,828 B2. For more details, how spherical tank module can be configured and used, reference is made to the EP patent application no 21 188 290.7 as filed on Jul. 28, 2021, the content thereof is incorporated herein by reference. Some embodiments of the invention are configured as mentioned in this prior EP patent application together with a hydrogen collector as described in more detail below.

According to some embodiments, soccer-ball shaped pattern of tiles with channels are provided, wherein the tiles have at least five different geometries in order to cover cylindrical tanks with spherical end caps.

According to some embodiments, the rigid element includes surface integrated $H_2$ collector cavities in different shapes—such as spiral, channel systems, lines, etc.

Some embodiments provide rigid elements such as tiles with collector, insulation and structural functionality. Preferred functionalities are for example:

$H_2$ collector: Collect and vent leaked hydrogen through integrated cavities.

Insulation: rigid flat elements filled with highly insulating core e.g., vacuum/glass bubbles or aerogel or other cellular structures with low thermal conductivity but high weight related stiffness (lattice, TPLS, etc. and vacuum). Such rigid elements are generally known from the state of art of vacuum panels as mentioned above and are available on market.

Structural support: tiles to be fixed together by means of form-fit edges and/or additional 3D-reinforcements/supports to a surrounding structural system.

Some embodiments provide a hydrogen collector for a $H_2$ capturing skin for liquid $H_2(LH_2)$ storage systems. Some embodiments relate to a functionalized integrated composite tank wall with allowed but controlled/monitored permeability including $H_2$ collector and thermal insulation functionalities. Some advantages of the solution according to these embodiments are for example:

less or no uncontrolled leakage of $H_2$;

Weight: −20% compared to composite $LH_2$ tank opportunity (−50% compared to metal baseline);

better efficiency thanks to saving and storing $LH_2$ for reuse (estimated boil off tight tank 1-5%);

Opportunity for at least cost neutrality compared to a tight composite, as crack initiating flaws are no longer an issue and thus quality requirements can be relieved.

BRIEF DESCRIPTION OF THE DRAWINGS

Embodiments of the invention are described in more detail with reference to the accompanying schematic drawings. Therein

FIG. 9 shows a perspective view, partly broken away, of another possible embodiment of a hydrogen tank assembly and FIG. 10 shows a perspective view of a rigid element with a cavity usable in the different embodiments of the invention.

DETAILED DESCRIPTION OF THE PREFERRED EMBODIMENTS

Figure 1:
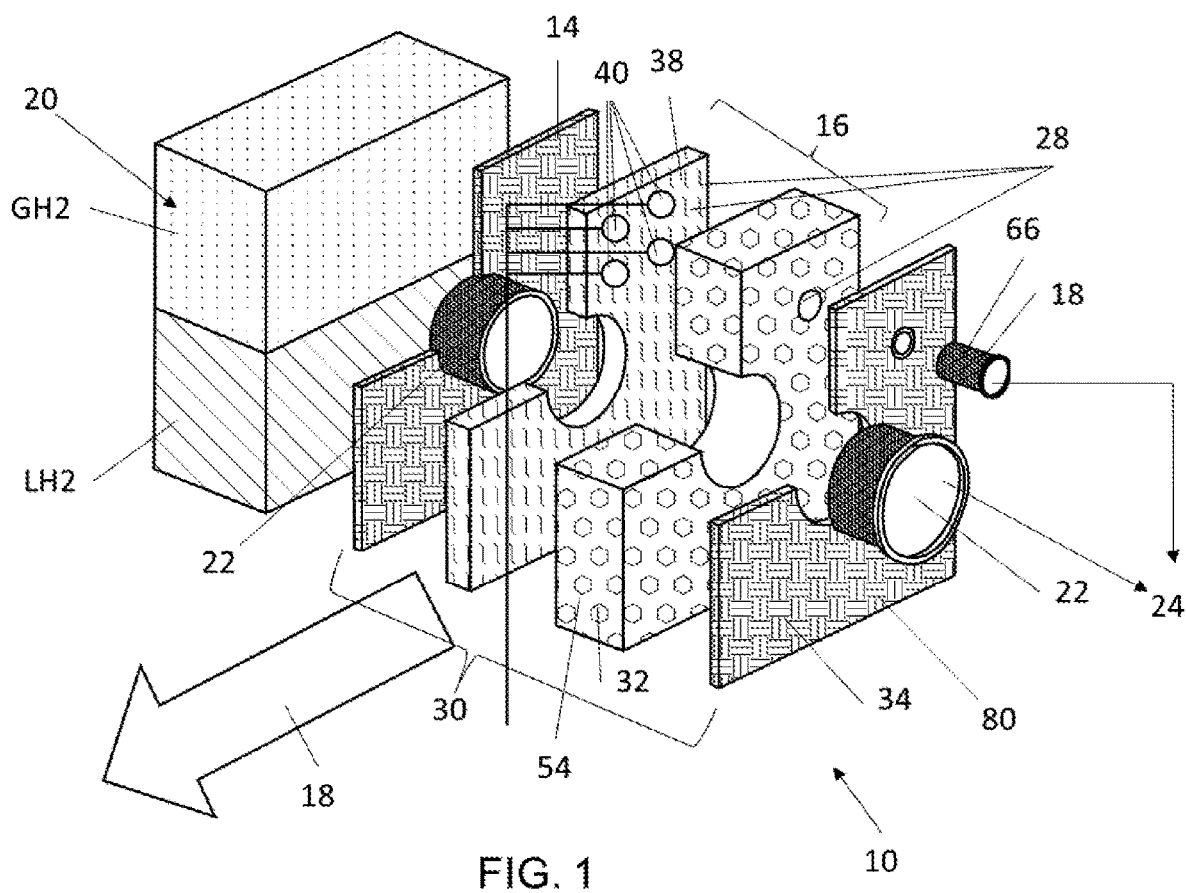
FIG. 1 shows a schematical exploded perspective view of a portion of a hydrogen tank assembly according to one possible embodiment of the invention.
Figure 2:
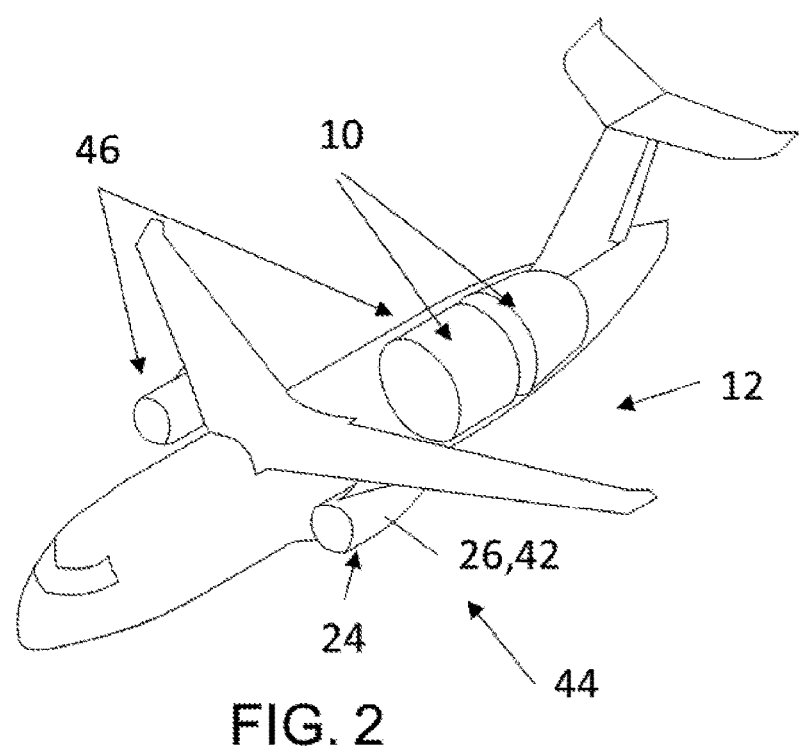
FIG. 2 shows a perspective schematic view of an aircraft as an example for a vehicle in which such hydrogen tank assembly is used.

FIGS. 1 and 3-9 show several possible embodiments of a hydrogen tank assembly 10 for a vehicle 12; an example for such a vehicle 12 is shown in FIG. 2, and FIG. 10 shows a possible element used in the hydrogen tank assembly 10 according to embodiments of the invention.

Figure 4:
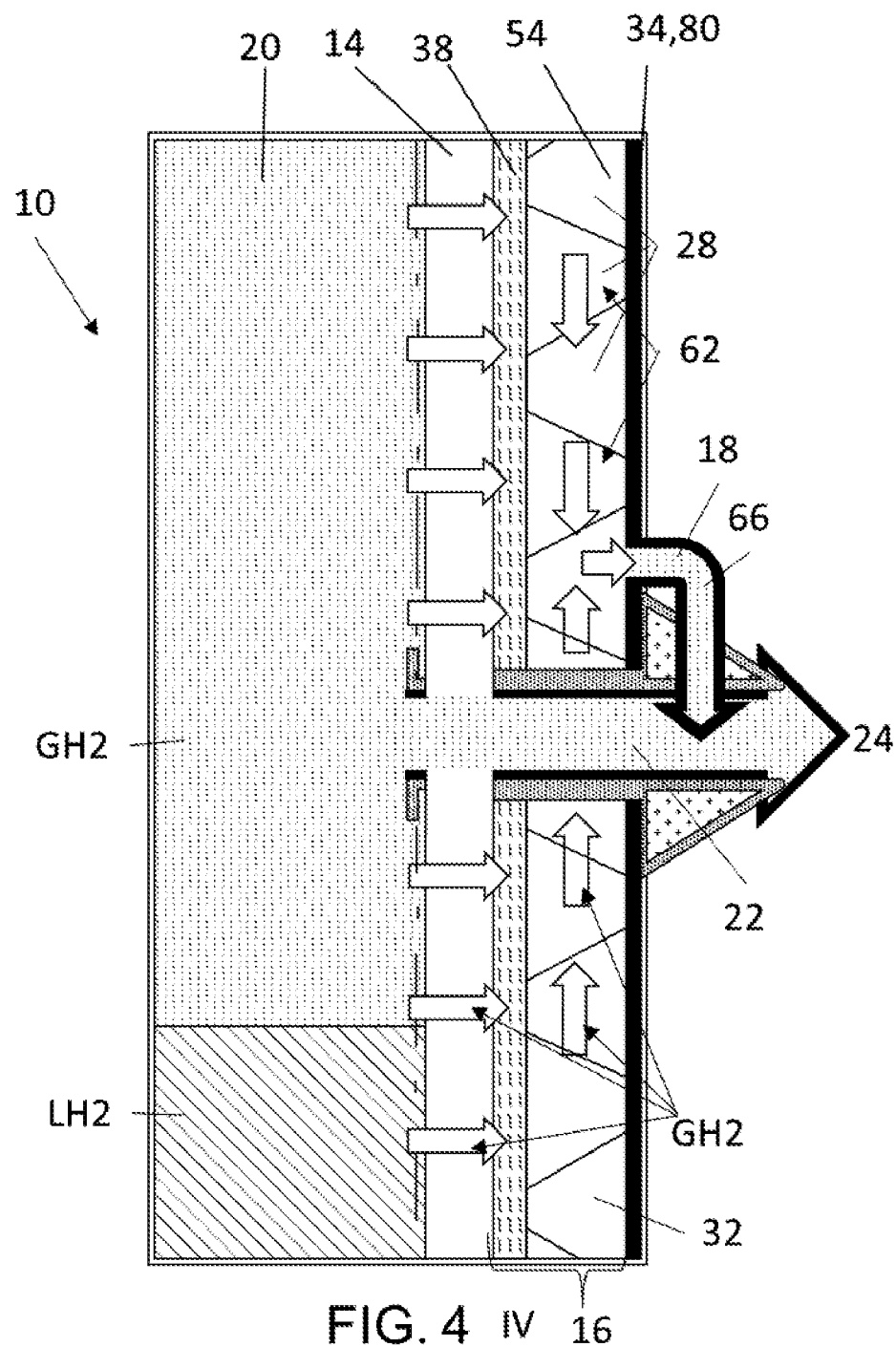
FIG. 4 shows an enlarged schematical view of the detail IV of FIG. 3.
Figure 5:
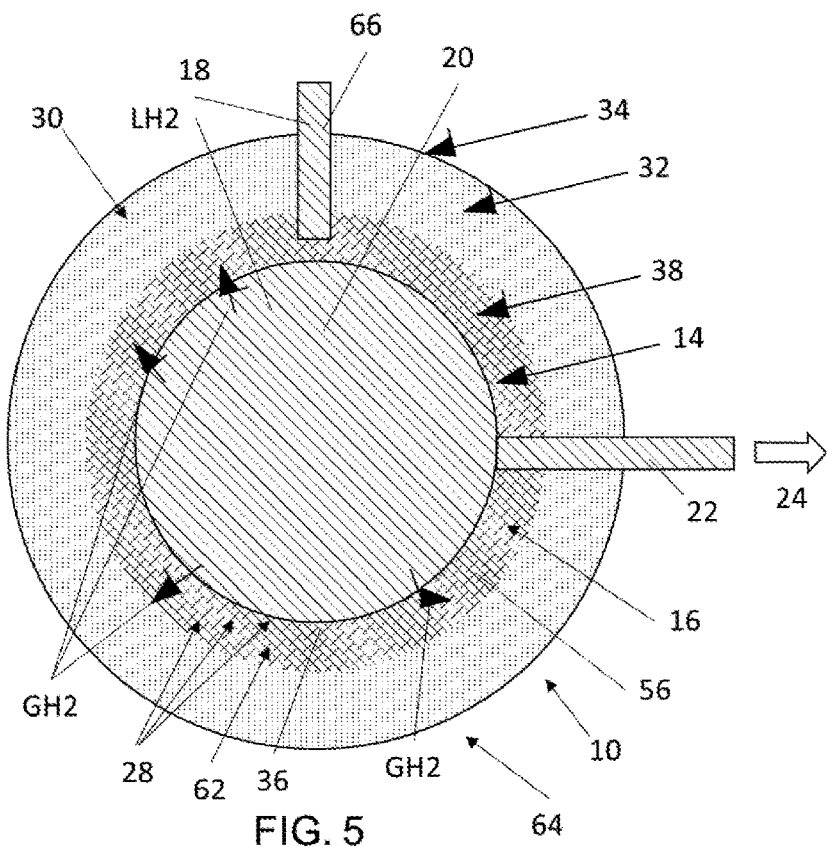
FIG. 5 shows a sectional view of a further embodiment of the hydrogen tank assembly.

As visible from FIGS. 1, 4 and 5, the hydrogen tank assembly 10 comprises an inner tank wall 14 and an outer hydrogen collector 16 and at least one hydrogen outlet 18 connected to the outer hydrogen collector 16.

The inner tank wall 14 defines a hydrogen tank volume 20 configured for storing liquid hydrogen $LH_2$. The inner tank wall 14 may be made from any suitable material such as metal, fiber reinforced plastic, especially CFRP, and from composite materials. The hydrogen tank volume 20 is connected to at least one main tank pipe 22 for filing and/or emptying the hydrogen tank. Although only one main tank pipe 22 is shown, there may be one filling tank pipe which is connected to a hydrogen tank nuzzle (not shown). The at least one main tank pipe 22 may be connected to a hydrogen consumer 24 such as an engine 26 for direct burning the hydrogen or a fuel cell (not shown) for generation of electric power.

The outer hydrogen collector 16 is arranged adjacent to the inner tank wall 14 such that it defines, together with the inner tank wall 14, at least one cavity 28. Gaseous hydrogen $GH_2$ leaking through the inner tank wall 14 is collected in the at least one cavity 28 and may be led through the hydrogen outlet 18 to a further hydrogen storage (not shown) or into the main tank pipes 22 or directly to the hydrogen consumer 24.

The inner tank wall 14 and the outer hydrogen collector 16 are preferably parts of a tank wall assembly 30 which surrounds the hydrogen tank volume 20.

A possible embodiment of the tank wall assembly 30 is shown in FIG. 1. The hydrogen tank volume 20 contains liquid hydrogen $LH_2$ and gaseous hydrogen $GH_2$. The hydrogen tank assembly 10 may be configured as a cryogenic hydrogen tank for storing liquid hydrogen $LH_2$ at a low temperature of, e. g. −20 K.

The use of composite material for an $LH_2$ tank is advantageous for saving weight. Life-time tightness may be a challenge. The hydrogen tank assembly 10 preferably uses a functionalized integrated composite inner tank wall 14 with an allowed permeability of hydrogen $H_2$. Hydrogen $H_2$ leaking through the inner tank wall 14 is collected in the hydrogen collector 16. Preferably, permeability of hydrogen is allowed but controlled and/or monitored. As shown in FIG. 1, one possible embodiment of the hydrogen tank assembly 10 has the tank wall assembly 30 which includes the inner tank wall 14, the hydrogen collector 16, thermally insulating material 32 and a gas tight layer 34.

The inner tank wall 14 may be an CFRP skin 36. The hydrogen collector 16 may include a hydrogen collector ply 38. Further, several sensors 40 for monitoring a $GH_2$ leakage rate and/or a $LH_2$ level may be arranged in or at the hydrogen collector 16. The sensors 40 are part of a fully covered monitoring system for monitoring the $GH_2$ leakage rate and the $LH_2$ level.

The hydrogen outlet 18 may also be monitored by sensors. Further, the atmosphere in the hydrogen collector 16 may be controlled for controlling the permeability. Especially, the hydrogen collector 16 may be influenced by collector 16 may be influenced by inert gases as described and shown in the European patent application with the application number EP 21 185 667.9. These inert gases may also be used as flushing media for flushing the $LH_2$ from the at least one cavity 28 into the hydrogen outlet 18. The ventilated $GH_2$ may be reused in the aforementioned or a further hydrogen consumer 24 such as a turbine 42 or a fuel cell (not shown).

FIG. 2 shows an aircraft, especially an airplane 44 as an example for the vehicle 12 in which the hydrogen tank assembly 10 is used. The airplane 44 has a propulsion system with turbines 42 as engines 26. The turbines 42 are configured to burn hydrogen supplied from the hydrogen tank assembly 10. Further, the airplane 44 may be equipped with fuel cells (not shown), wherein hydrogen is supplied to the fuel cells from the hydrogen tank assembly 10.

Figure 3:
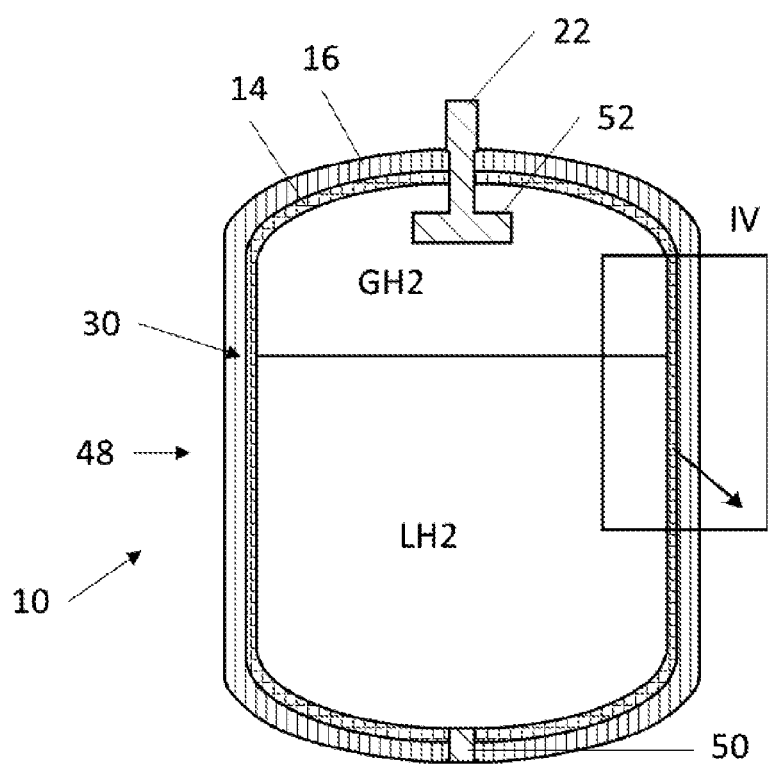
FIG. 3 shows a sectional side view of a hydrogen tank assembly according to a possible embodiment of the invention.

FIG. 3 shows a possible embodiment of the hydrogen tank assembly 10 in the form of a cylindrical tank 48. Hydrogen is supplied from the tank 48 via the main tank pipe 22 to the hydrogen consumers 24. The tank 48 may be filled via a filling connection 50. The main pipe 22 is connected to a gas diffuser 52.

FIG. 4 shows the detailed arrangement of the tank wall assembly 30 of the tank 48 of FIG. 3.

The wall assembly 30 includes the CFRP skin 36 as inner tank wall 14, the hydrogen collector 16 and an outer film, skin or shell as outer gas tight layer 34. The hydrogen collector 16 is configured as multifunctional material core combining the function of $H_2$ collection, thermal insulation and structural support for the inner tank wall 14. The hydrogen collector 16 includes at least one rigid element 54 which defines, together with the inner tank wall 14, the at least one cavity 28. The rigid element 54 is a composite structure, for example a composite sandwich structure. It may include the hydrogen collector ply 38 which may be made from micro-porous material 56 such as non-woven or woven fabric, foams, etc.

Further, the hydrogen collector 16 may include macro-porous materials 58 such as fold-cores 60, perforated honeycombs, or other rigid elements with cavities.

As visible in FIG. 4, $GH_2$ leaking through the inner tank wall 14 is collected via the hydrogen collector ply 38 and led into the cavities 28 of the hydrogen collector 16. Several cavities 28 are connected to each other to form at least one channel system 62. Each individual channel system 62 is connected to at least one hydrogen outlet 18 so that leaking $LH_2$ is lead to the hydrogen outlet 18 and, for example via the main tank pipe 22, to the at least one hydrogen consumer 24.

FIG. 5 shows an embodiment of the hydrogen tank assembly 10 which forms a spherical tank 64. Further details, how such a spherical tank 64 can be used in a modular tank system are described in the European patent application with the application number EP 21 188 290.7. The hydrogen tank assembly 10 according to the embodiment of FIG. 5 includes the spherical inner tank wall 14, formed by the CFRP skin 36, which is, as in the other embodiments, surrounded by the hydrogen collector 16 which further is surrounded by the outer gas tight layer 34, such as an outer skin. The main tank pipe 22 is connected to the inner hydrogen tank volume 20 and leads to the at least one hydrogen consumer 24. The hydrogen collector 16 includes the hydrogen collector ply 38 and the thermally insulating material 32. The hydrogen collector ply 38 is made from micro-porous material 56 for defining the cavities 28 and flow channels of the network 62. The hydrogen collector ply 38 contacts directly the outer side of the inner tank wall 14 and functions as a drainage layer.

The micro-porous material 56 is preferably made from a bulky permeable dry non-woven fabric. Especially, the fabric is made from several layers of non-woven fibers. Preferably, the thickness of these non-woven layers is variable to ensure that flow channels also exist under load. The density of the flow channels may be different in different areas of the hydrogen collector ply 38. For example, the flow channel density is increased towards the leakage pipe 66 which defines the hydrogen outlet 18. Drainage pipes (not shown) can be incorporated in the non-woven. Further, supporting elements, such as springs (not shown), can be incorporated in the hydrogen collector ply 38 to carry the weight of the inner tank. Further, the insulation layer—thermally insulating material 32—may be provided with flow channels as a part of the network 62. The fibers may be hollow in order to provide a better permeability.

The sensors 40 may be included in the hydrogen collector ply 38. Several sensors 40 can be used such as sensors for detecting crack sounds, temperature, $H_2$, pressure loss, . . . . Further, continuous fabrics made from Kevlar can be included in the wall assembly 30 for enhancing the structural strength of the wall assembly enclosing the inner tank wall 14. Electrically conductive fibers (intrinsic or by coating) can be used to establish new functions.

Low and high CTE fibers can be mixed in woven fabrics to establish a tolerance compensation due to thermal shrinkage of the insulation. Further, different CTEs may be compensated by many elastic materials.

The hydrogen collector 16 preferably includes several permeable layers and especially a combination of micro-porous materials 56 as referred in the embodiment of FIG. 5, as well macro-porous materials 58. An example is shown in FIG. 6, where rigid elements with cavities 28 such as fold-core 60 and a layer with flow channels 68 is combined with a further gas tight barrier 70 and a thermally insulating material 32.

Figure 6:
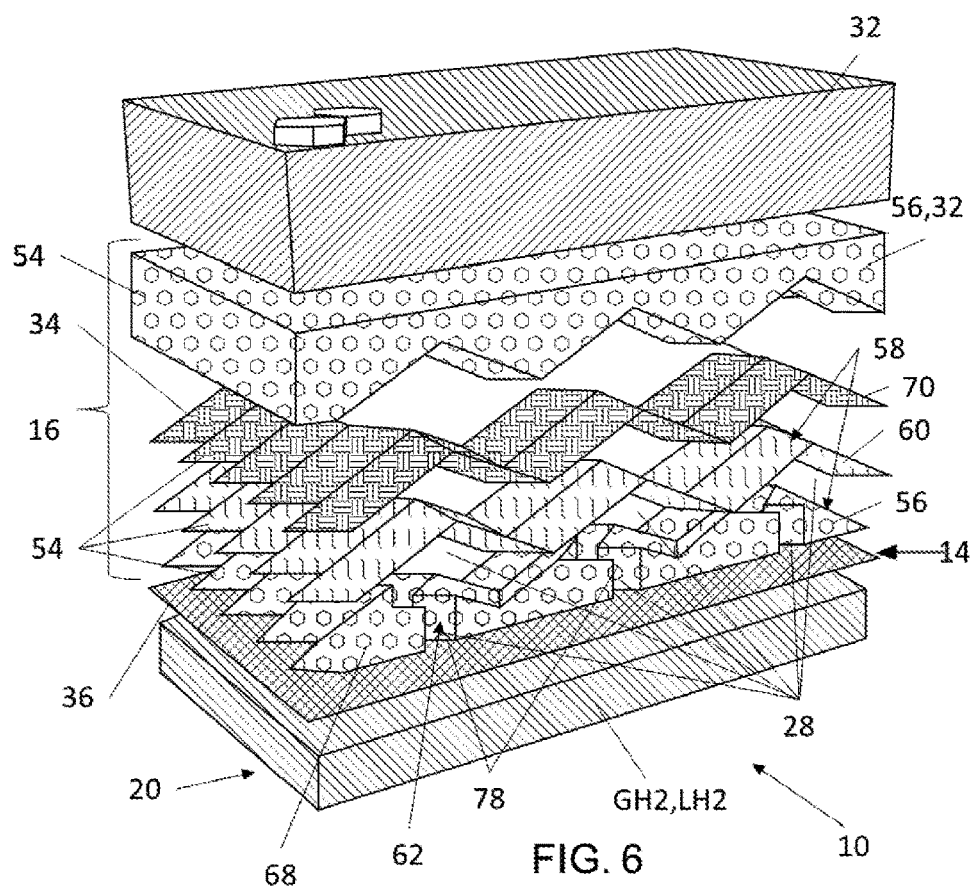
FIG. 6 shows an exploded sectional view of a portion of a hydrogen tank assembly according to another possible embodiment.
Figure 7:
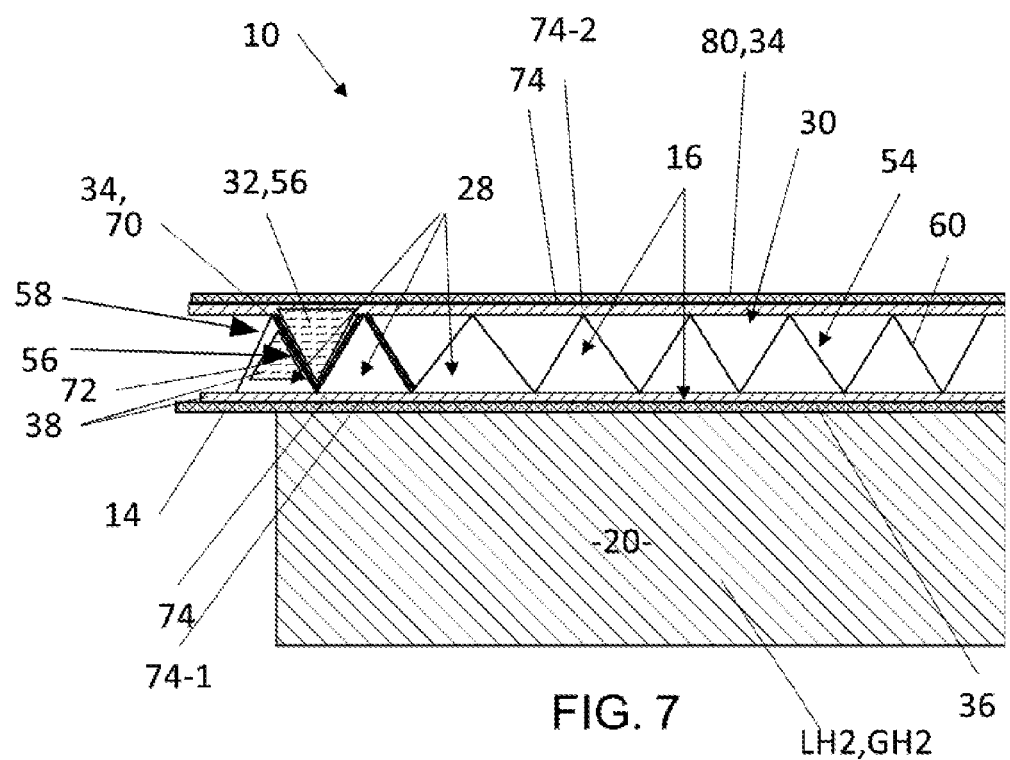
FIG. 7 shows a sectional view of a portion of a hydrogen tank assembly according to a further possible embodiment of the invention.
Figure 8:
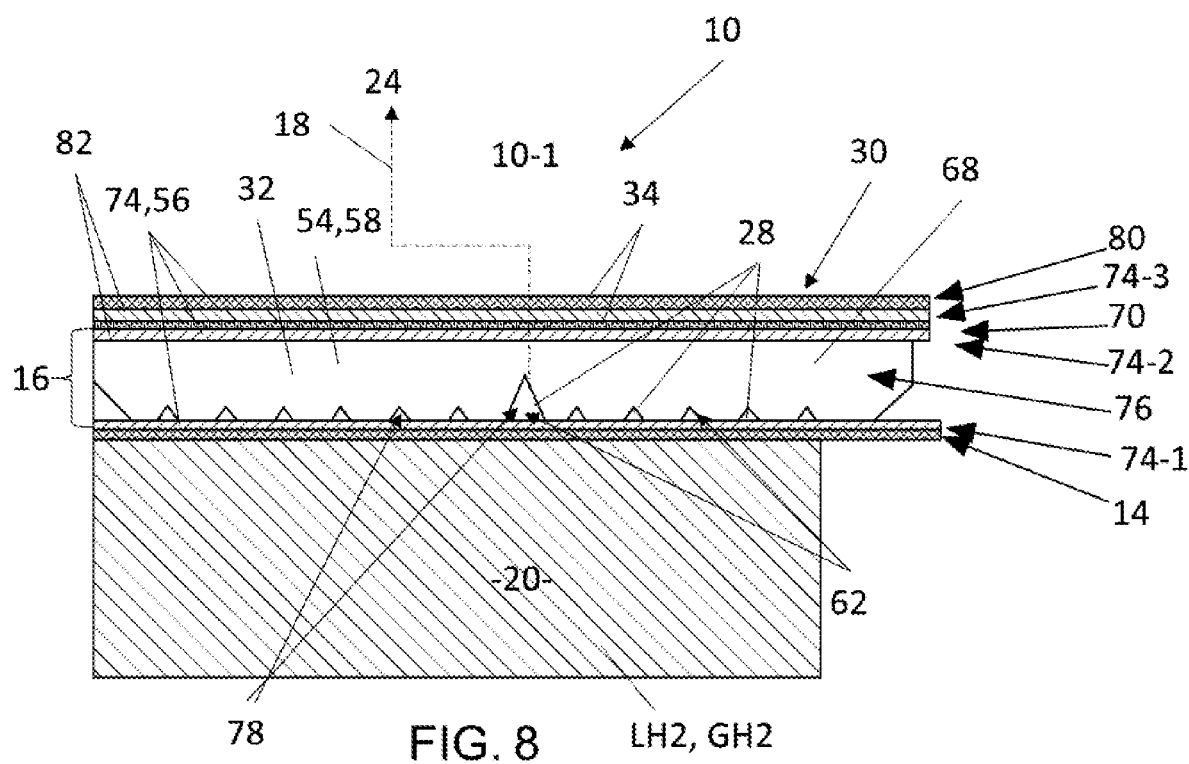
FIG. 8 shows a schematic sectional view of a portion of another possible embodiment of the invention.

The micro-porous materials 56 and the macro-porous materials 58 can be combined to a lay-up as shown in FIG. 6, FIG. 7 or in FIG. 8. FIGS. 6 and 7 show a folded core material 60 covered by an additional barrier sheet 70 and partly filled with a micro-porous material 56, for example an open-porous foam 72.

FIG. 8 shows another example for such a lay-up of a combination of micro-/macro-porous materials 56, 58. The wall assembly 80 of the hydrogen tank assembly 10 of the embodiment as shown in FIG. 8 includes the inner tank wall 14 which defines the hydrogen tank volume 20 covered by a dry fabric 74,74-1 and the rigid element 54 which is here a rigid tile 76 with channels 78 integrated between the inner tank wall 14 and the outer tank wall 80. The tile can be made from any suitable material as this is known from [1] to [3] as mentioned above. Such materials are available in the market. In more detail, the rigid element may be made from micro-porous materials generally known from [1] and [2] as mentioned above as core materials for vacuum panels. Such core materials are available from the market. Other as in vacuum panels, the porosity of such core can be used here to collect and transport hydrogen. Hence, the core material does not necessarily be enclosed by a gas tight sealing material. Further, at least one additional channel 78 is integrated in such material. FIG. 10 shows an example of the form of such channel 78.

According to one example, the tile 76 may be made from thermally insulation material, such as PU foam or aerogel, wherein additional macro-channels 78 are provided for leading leaking hydrogen to the at least one hydrogen outlet 18.

Further, the tile 76 of the embodiment of FIG. 8 is covered by dry fabric 74, 74-2 for example a fleece 82, a barrier 70 which defines an outer gas tight layer 34, and further layer of dry fabric 74, 74-3.

FIG. 9 shows a further example of the hydrogen tank assembly 10 defining a spherical tank 64 as an example of special use of several of the tiles 76 as shown in FIG. 8. The hydrogen tank assembly 10 of FIG. 9 includes the following layers (seen from inside to outside): the CFRP skin 36 forming the inner tank wall 14, a first layer 74-1 of dry fabric 74, a first tile layer 76-1 formed by an arrangement of several of the tiles 76, a second layer 74-2 of dry fabric 74, a barrier ply 70, a third layer 74-3 of dry fabric, a second tile layer 76-1 formed by an arrangement of tiles 76, an outer skin as outer tank wall 80 and an outer barrier ply 84. The dry fabric 74 is an example for the micro-porous material 56.

As this is generally known from [3], the tiles 76 forming the tile layers 76-1, 76-2 are tiles with double curvature in order to be adapted to the spherical form. When using such lay-up in a cylindrical tank 48 such as shown in FIG. 3, tiles with single curvature may be used.

As shown in FIG. 10, the rigid element 54, such as the tile 76, may have $H_2$ collector cavities 28 in the form of spiral channels 78, other shapes are possible, such as a network shape, lines, etc. Preferably, the channel 78 or a channel system is distributed over the rigid element 54 and has one central outlet opening for leading the hydrogen to the hydrogen outlet 18.

A sensor 40 may be provided at the central outlet of the channel 78 or the channel system. Thus, one sensor 40 can be used for monitoring the condition (e.g., leakage rate) over the whole area of the channel 78 or the channel system.

FIG. 10 shows the channel 78 provided on the side of the rigid element 54 facing the inner tank wall 14.

The rigid elements 54 such as the tiles 76 have collector, insulation and structural functionality. Through the integrated cavities 28, the rigid elements 54 collect the then leaked hydrogen. The tiles 76 may be filled with highly insulating core such as vacuum/glass bubbles, aerogel or cellular structures with low thermal conductivity but high weight related stiffness. Especially, the tiles 76 may be made from core materials as available on the market used as cores in vacuum panels including a lattice, TPLS, etc. Further, the tiles 76 may be fixed together by means of form-fit edges and/or additional 3D reinforcements of supports to a surrounding structural system. The tiles 76 are rigid structures in order to provide a good structural support.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 10 hydrogen tank assembly
12 vehicle
14 inner tank wall
16 outer hydrogen collector
18 hydrogen outlet
20 hydrogen tank volume
22 main tank pipe
24 hydrogen consumer
26 engine
28 cavity
30 tank wall assembly
32 thermally insulating material
34 outer gas tight layer
36 CFRP skin
38 hydrogen collector ply
40 sensor
42 turbine
44 airplane
46 propulsion system
48 cylindrical tank
50 filling connection
52 gas diffuser
54 rigid element
56 micro-porous material
58 macro-porous material
60 fold-cores
62 network
64 spherical tank
66 leakage pipe
68 layer with flow channels
70 barrier
72 open-porous foam
74 dry fabric
74-1 first layer dry fabric
74-2 second layer dry fabric
74-3 third layer dry fabric
76 tile
76-1 first layer of tiles
76-2 second layer of tiles
78 channels
80 outer tank wall
82 dry fabric (fleece)
84 outer barrier ply
$GH_2$ gaseous hydrogen
$LH_2$ liquid hydrogen

The invention claimed is:

1. A hydrogen tank assembly for a vehicle, the hydrogen tank assembly comprising
an inner tank wall defining a volume of a hydrogen tank configured for storing liquid hydrogen; and
an outer hydrogen collector defining, together with the inner tank wall, at least one cavity outside of the hydrogen tank volume and including at least one hydrogen outlet for leading gaseous hydrogen which leaks from the hydrogen tank through the inner tank wall into the at least one cavity to a hydrogen storage or a hydrogen consumer, wherein the outer hydrogen collector includes a rigid element that forms together with the inner tank wall and the at least one cavity and is configured as a hydrogen flow channel.

2. The hydrogen tank assembly according to claim 1, wherein
the hydrogen collector at least one of
surrounds the inner tank wall, or
includes at least one hydrogen collector ply,
wherein the at least one cavity is separated toward an outer ambient atmosphere.

3. The hydrogen tank assembly according to claim 1, wherein the at least one collector ply is selected from the group consisting of
a permeable layer,
a micro-porous material,
a non-woven fabric,
a bulky non-woven fabric,
a permeably fabric,
a permeable dry fabric,
an open-porous foam,
a ply with several layers with non-uniform thickness,
a material with flow channels,
a material with flow channels with different flow channel density in different areas,
a fabric with incorporated drainage pipes,
a woven fabric, and
a combination of at least two of the aforementioned group members.

4. The hydrogen tank assembly according to claim 1, wherein the at least one rigid element is selected from the group consisting of a permeable layer, a macro-porous material, a folded core, a combination of a folded core with insulation material, an arrangement of perforated honeycombs, a rigid element with several cavities, a tile with drainage channels, a plurality of elements covering the inner tank wall in one or several layers; a plurality of tiles covering the inner tank wall in a soccer-ball pattern in one or several layers, an element being at least partly covered by dry textiles, and a combination of at least two of the aforementioned group members.

5. The hydrogen tank assembly according to claim 1, wherein the at least one rigid element has at least one or several of the following features:
the at least one rigid element comprises an additional gas tight layer,
an outer side of the at least one rigid element is sealed by a gas tight layer,
the at least one rigid element is arranged between the inner tank wall and an outside layer, wherein the hydrogen tank assembly comprises an atmosphere control device configured to control an atmosphere between the inner tank wall and the outside layer;
several of the rigid elements cover the inner tank wall in one or several layers;
several of the rigid elements are at least partly connected to adjacent layers, especially by at least one of an adhesive, by welding or by a form-fit connection.

6. The hydrogen tank assembly according to claim 1, wherein the at least one cavity has at least one or several of the following features:
the at least one cavity is defined by a plurality of cavities forming at least one interconnected network;
the at least one cavity is part of a network of cavities having at least one outlet tube;
the at least one cavity is defined by a plurality of cavities connected such that they form several networks wherein each network has at least one outlet tube;

the at least one cavity is configured to be influenced, especially flushed, by a flushing medium.

7. A modular hydrogen tank comprising several hydrogen tank assemblies according to claim 1, as tank modules.

8. A propulsion system for an aircraft comprising
a hydrogen tank assembly according to claim 1,
a hydrogen powered engine as a hydrogen consumer or a hydrogen powered fuel cell as a hydrogen consumer, and
an electric motor.

9. A vehicle comprising a hydrogen tank assembly according to claim 1.

10. A vehicle comprising a modular hydrogen tank according to claim 7.

11. A vehicle comprising a propulsion system according to claim 8.

* * * * *